J. LEVY.
CONTAINER.
Jan. 10, 1933. Re. 18,711
Original Filed Aug. 9, 1919
Fig. 1
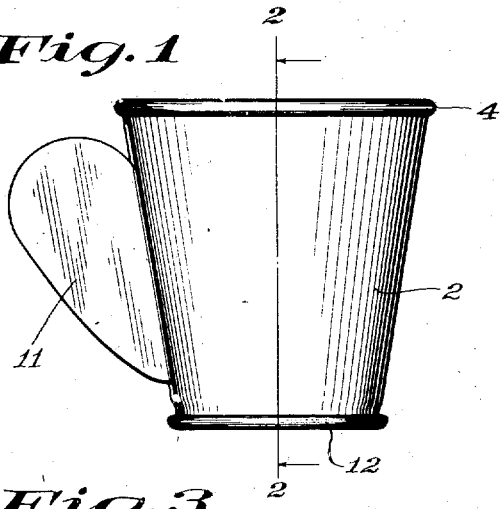
Fig. 2.
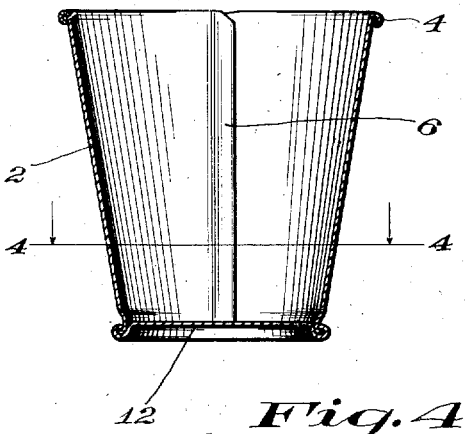
Fig. 3.
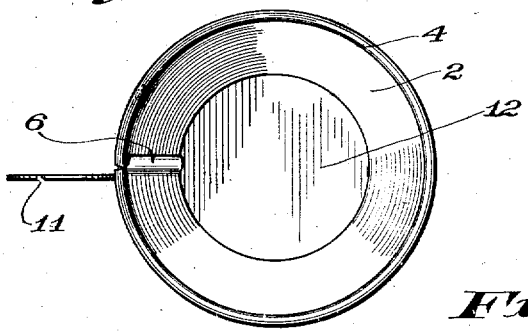
Fig. 4.
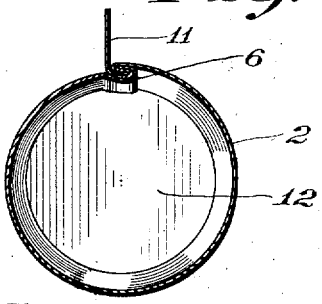
Fig. 5.
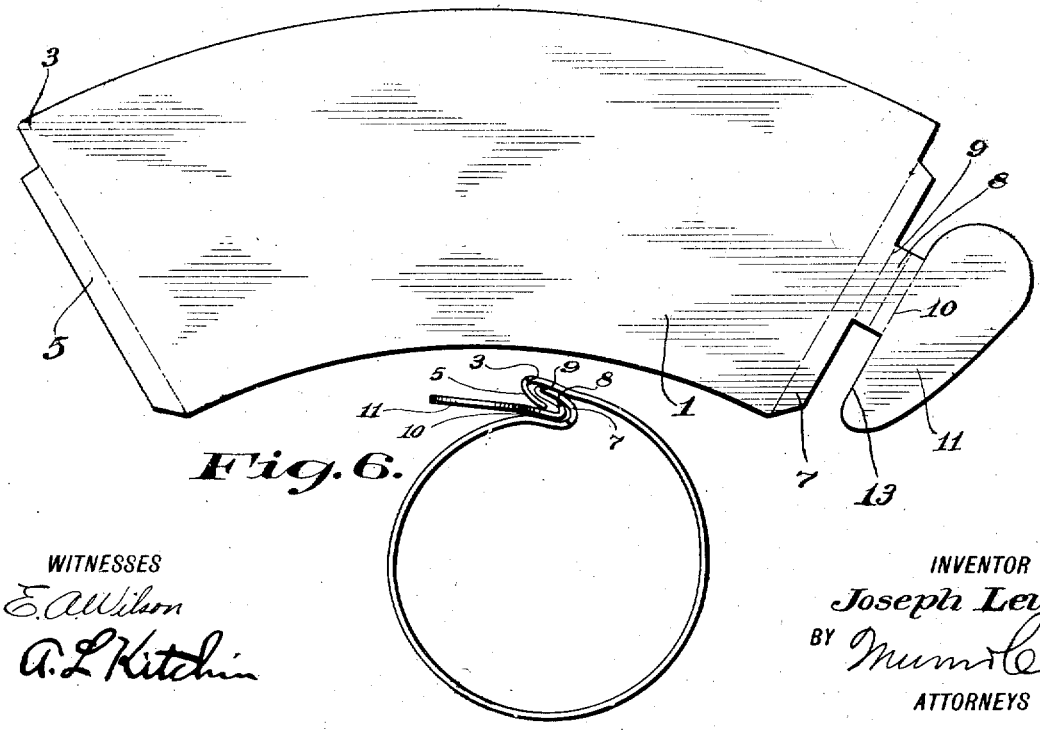
Fig. 6.
WITNESSES
E. A. Wilson
A. L. Kitchin
INVENTOR
Joseph Levy
BY Munn & Co.
ATTORNEYS Reissued Jan. 10, 1933 Re. 18,711

UNITED STATES PATENT OFFICE

JOSEPH LEVY, OF BROOKLYN, NEW YORK, ASSIGNOR, BY MESNE ASSIGNMENTS, TO BEACH & ARTHUR, INC., OF INDIANAPOLIS, INDIANA

CONTAINER

Original No. 1,384,725, dated July 12, 1921, Serial No. 316,285, filed August 9, 1919. Application for reissue filed December 17, 1931. Serial No. 581,765.

This invention relates to containers and particularly to those provided with handles or supports and has for an object to provide an improved construction wherein the handle is formed integral with the body of the container.

Another object of the invention is to provide an improved construction of container wherein the handle is simultaneously fixed in position when the seam is formed which holds the abutting ends of the container block together.

A further object is to provide a container in the form of a cup constructed of sheet metal formed from a single blank for the sides and a separate blank for the bottom connected to the side blank by a seam while the side blank is seamed together in such a manner as to cause one end to project and thereby present a handle integral with the sides.

In the accompanying drawing:

Figure 1 is a side view of a container disclosing an embodiment of the invention.

Fig. 2 is a section through Fig. 1 on line 2—2.

Fig. 3 is a top plan view of the construction shown in Fig. 1.

Fig. 4 is a section through Fig. 2 on line 4—4.

Fig. 5 is a plan view of a blank from which the sides of the container are constructed.

Fig. 6 is a top plan view similar to Fig. 3 except the seam is not fully made and the top roll has not yet been formed.

Referring to the accompanying drawing by numerals, 1 indicates the main body portion of a blank from which the sides 2 of the container are made. This blank is shown arc-shaped, but it could be formed rectangular without departing from the spirit of the invention. The blank is formed with an upper section 3 designed to be turned over into the bead or roll 4 when the container is complete. At one end the blank is formed with a section 5 designed to be bent over to form part of the finished seam 6, which seam may be an ordinary single seam or a double locked seam. At the end of the blank opposite section 5 is a bending section 7 adapted to be bent over and interlock with section 5 as shown in Figs. 4 and 6. Section 7 is provided with an integral neck portion 8 adapted to be bent along the lines 9 and 10 so that the extension 11 may be caused to project substantially normal to the sides 2 and act as a handle when the container is completed. The blank is first bent as shown in Fig. 6 and then as shown in Fig. 4 and finally as shown in Fig. 2. After the seam 6 has been completed the bottom 12 is seamed on and then section 3 is turned over for forming the roll or bead 4. It will be noted that the inner edge 13 is at substantially the same angle as the sides 2 so as to press against the same when in use.

What I claim is:

1. A container, comprising a side member having at one end at about the middle of its width an integral neck terminating in an enlargement, said side member having its ends seamed together, the neck being doubled up and lying in the seam and with the enlargement projecting at right angles and having the portions on each side of the neck in engagement with the said member, and a bottom member seamed to the side member.

2. A blank for forming the sides of a container, said blank having a main body portion with upper and lower edges substantially equidistant and formed with similar bending sections at each end, a neck projecting from one of said sections, and an enlargement projecting from said neck, the edge of the enlargement adjacent said neck being parallel with the edge of the last mentioned bending section.

3. In a frusto conical container, the combination with a substantially circular bottom member and a side forming member comprising a one piece blank having a main body portion with a large radius curvature upper edge and a concentric large radius curvature lower edge, the lower edge being connected to the bottom member, the ends of the main body portion overlapping to form a joint, and a reduced neck portion integral with the body portion at one end, and of reduced depth, and an enlarged portion integral with the neck portion and projecting therefrom, said neck portion including radial creases at least two of which substantially coincide with the joint and each other, one of said portions being connected to the cup when in cup formation and at the overlapping joint and adapted to project radially therefrom for handle purposes, the handle being of less radial depth than the depth of the container and the joint constituting a reenforcement for the handle connection.

4. A one piece blank for forming the sides and handle of a frusto conical container, said blank having a main body portion with concentric upper and lower edges and similar connecting edges, a neck projecting from one of said connecting edges and intermediate the upper and lower edges, and an enlargement projecting from said neck, the edge of the enlargement adjacent the neck being substantially parallel with the connecting edge from which the neck projects.

In witness whereof, I have hereunto affixed my signature.

JOSEPH LEVY.